United States Patent

[11] 3,627,406

| | | |
|---|---|---|
| [72] | Inventor | Oreste Blumenthal<br>Corso Montevecchio n., 36 Turin, Italy |
| [21] | Appl. No. | 6,518 |
| [22] | Filed | Jan. 28, 1970 |
| [45] | Patented | Dec. 14, 1971 |
| [32] | Priorities | May 28, 1969 |
| [33] | | Italy |
| [31] | | 52012-A/69;<br>Dec. 22, 1969, Italy, No. 54474-A/69 |

[54] SPECTACLE FRAME WITH FLEXIBLE SIDEBARS
3 Claims, 26 Drawing Figs.
[52] U.S. Cl. ................................................. 351/114,
351/117, 351/178
[51] Int. Cl. ..................................................... G02c 5/16
[50] Field of Search............................................ 351/114,
83, 178, 111, 117

[56] References Cited
UNITED STATES PATENTS

| 3,052,160 | 9/1962 | Ratti............................ | 351/114 X |
| 3,489,490 | 1/1970 | Seaver......................... | 351/153 |

FOREIGN PATENTS

| 1,121,362 | 1/1962 | Germany..................... | 351/114 |

Primary Examiner—David Schonberg
Assistant Examiner—John W. Leonard
Attorney—Young & Thompson ABSTRACT: A spectacle frame with flexible sidebars is provided by inserting a series of elements in the sidebars which are alternately convexly and concavely cylindrical, with a flexible member transecting and interconnecting them. Part cylindrical shells are interposed between each two adjacent elements.

PATENTED DEC 14 1971
3,627,406
SHEET 1 OF 4
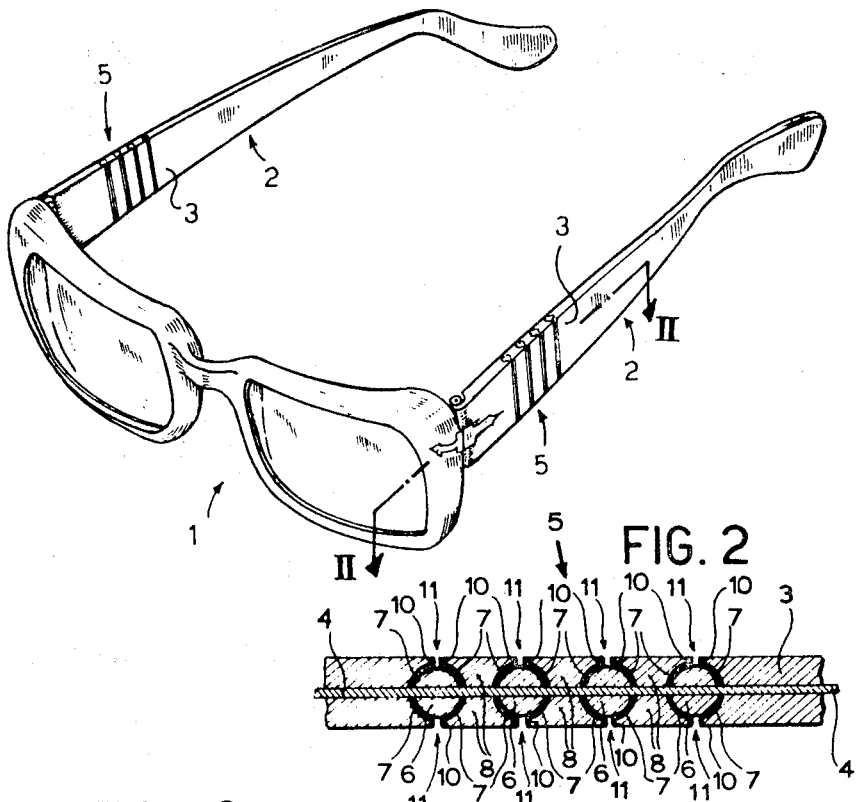
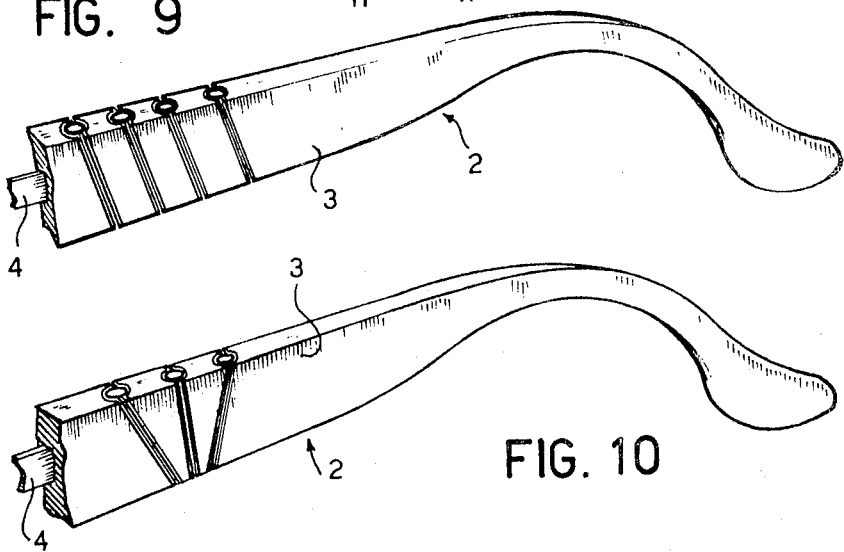
INVENTOR
ORESTE BLUMENTHAL
BY Young + Thompson
ATTORNEYS

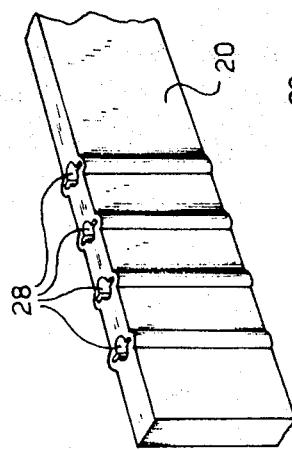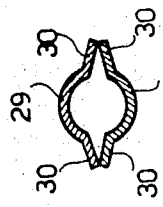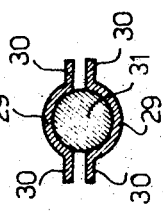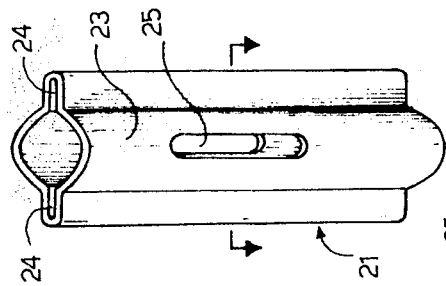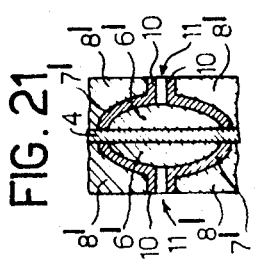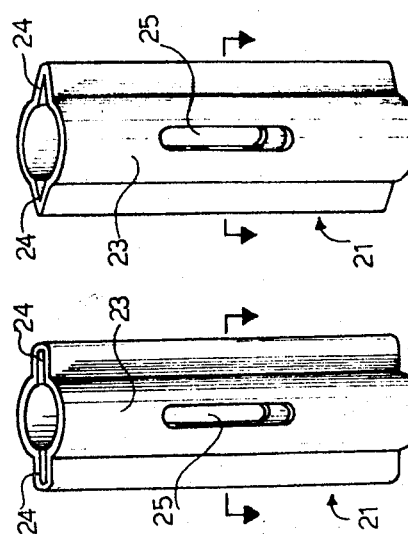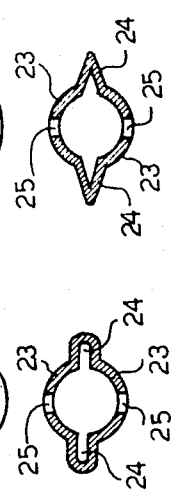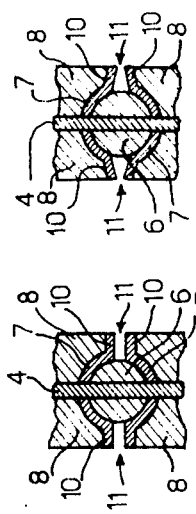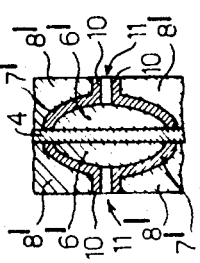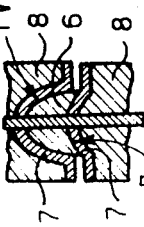

SPECTACLE FRAME WITH FLEXIBLE SIDEBARS

This invention relates to spectacle frames and more particularly to such frames made of metallic and nonmetallic materials, for instance celluloid or synthetic resins (among which, in particular, cellulosic resins, such as cellulose acetate) and the like, provided with side members or bars which are rendered flexible along a portion of their length, in order to more easily adapt the spectacle frame to the face of the wearer and to avoid any undesirable pressure as in the case of the conventional rigid sidebars.

The side members of spectacle frames made of synthetic materials, as it is known, substantially have the shape of a bar of rectangular cross section, or of different shape, provided at the inside with a metallic core in order to impart ruggedness and flexibility thereto. To render more flexible in a lateral direction the sidebars thus obtained, various constructional designs have been proposed, by which it has been tried to render less rigid at least a section of each side member or bar. The two most important solutions proposed hitherto for this purpose are substantially the following:

According to a first constructional design, in the portion of the sidebar to be rendered more flexible there is formed a number of slots in planes perpendicular to the axis of the bar or also sloping, which expose the metallic core, so that said bar will comprise—in the portion considered—a plurality of small blocks or segments arranged side by side.

However, this solution is not exempt from disadvantages. First of all, cutting of slots is a delicate operation, which requires a most accurate adjustment of the depth of cut, in order to avoid any damage to the flexible metal core. Further, impurities or foreign matters can easily enter into the slots thus formed in the bar, thereby reducing—even considerably in some instances—the flexibility of said bar, as well as chemical compounds (for instance from perspiration or the ambient atmosphere), with consequent risk of rusting and weakening said metal core. In order to avoid this disadvantage, the slots should be extremely thin, thereby considerably limiting the flexibility of the bar. Sometimes, in the slots mentioned above thin elements of metal or plastics have been interposed, which had however a merely ornamental purpose and did not avoid any of the above disadvantages.

According to another constructional design, the problem has been solved by creating in the portion of the bar to be rendered flexible a chain of elements mutually articulated and comprising, alternately, cylindrical bodies with small blocks interposed between them, whose faces directed towards the cylindrical bodies are concave in shape and have a cylindrical surface corresponding to a portion of that of the adjacent cylindrical bodies with which they are coupled.

However, this second solution, although imparting a fair degree of flexibility to the sidebar and avoiding the disadvantages inherent to the sidebars of the first kind described, is not quite satisfactory.

First of all, the flexural stiffness of the portion of the bar comprising said chain of articulated elements is still high. In fact, during the deformation of the sidebar an elastic bending of the metallic core and a relative movement of said cylindrical bodies with respect to the small blocks interposed between the latter take place, with consequent sliding movements in correspondence with the cylindrical surfaces of these elements coupled together. For a given maximum deformation of the sidebar, such sliding movements are the greater, the smaller is the number of the surfaces coupled to one another. Now, since the surfaces coupled together (whose number is twice as that of the cylindrical bodies inserted in each bar) cannot obviously be a great many such sliding movements will be, as a whole, very considerable, thereby rendering the sidebar rather stiff.

Further, when cylindrical bodies made of plastic material are utilized, on account of the high coefficient of friction between pairs of members of the same material, the stiffness can be still increased owing to the high-friction resulting from said surfaces coupled to one another.

Still another disadvantage of the flexible sidebars of the second kind described resides in the fact that, as a result of deformations of excessive amplitude of said bars, the edges of the small blocks interposed between the cylindrical bodies can become easily damaged or broken. In fact, when the metallic core is readily deformable, the deformation of the sidebar will be prevented only when the corresponding edges of the various small blocks interposed are brought in contact with one another. Now, since these small blocks—being formed from the same material of which the sidebar is made—are of not highly strong material, they can become easily damaged or broken in consequence of an excessive deformation of the sidebar.

One object of the present invention is to provide a spectacle frame with flexible sidebars, which permits to avoid the disadvantages enumerated above, inherent to the sidebars of the prior art.

The spectacle frame in accordance with the invention comprises sidebars wherein a portion which is intended to be rendered flexible is formed by a chain of mutually articulated elements, coupled to one another along cylindrical surfaces, which can be generated by a directrix whatever, and held together by a metallic inner core, and is characterized in that between any two adjacent articulated elements of said chain at least one intermediate member is interposed, having substantially the shape of a shell and adapted to be coupled with each of the adjacent cylindrical surfaces of said elements.

For a better understanding of the present invention, some particular embodiments thereof will now be described by way of nonlimiting example, as well as the various steps of their method of manufacture, with reference to the accompanying drawings, wherein:

FIG. 1 is a perspective view of a spectacle frame with flexible side members or bars according to the present invention;

FIG. 2 is a section of a sidebar of the spectacle frame of the invention along line II—II of FIG. 1;

FIGS. 9 and 10 show two flexible side members for the spectacle frame of FIG. 1, wherein the articulated elements of the chain are disposed with angles different from those with which they are disposed in the sidebars of FIG. 1;

FIG. 16 is a perspective view of a bar of the kind of that shown in FIG. 11, in which a number of holes has been formed for the insertion of said tubular members;

FIGS. 17 and 18 show, in perspective view and in section, respectively, a first embodiment of a tubular member and a section of a portion of flexible sidebar produced thereby;

FIGS. 19 and 20 show, in perspective view and in section, respectively, a second embodiment of a tubular member and a section of a length of flexible sidebar produced thereby;

FIGS. 21 and 22 show, in perspective view and in section, respectively, a third embodiment of a tubular member and a section of a length of flexible sidebar produced thereby;

FIGS. 23 and 24 show, in section only, a fourth embodiment of a tubular member and a section of a length of flexible sidebar produced thereby;

FIG. 25 is a section of a pair of elements provided for producing a pair of intermediate members in a flexible sidebar realized with the method of the invention, and FIG. 26 is a section of a pair of elements similar to those shown in FIG. 25, between which a spacing spindle has been inserted.

Figure 3:
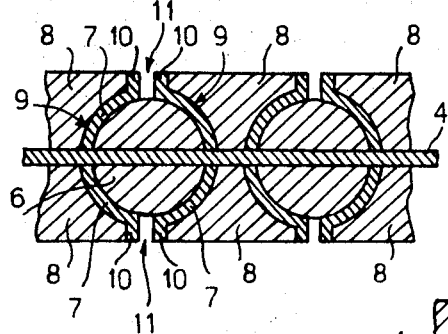
FIG. 3 shows, on a larger scale, a portion of the section of FIG. 2.

The spectacle frame, generally designated by the reference numeral 1 (FIGS. 1 and 2), comprises two side members or bars 2, each of which is substantially formed by a thin bar of synthetic material 3, normally of rectangular cross section, through which a metallic core 4 has been inserted (FIG. 2). Said metallic core 4 is formed for instance in known manner, by a thin steel plate whose thickness is small with respect to its height, or by another elastic element, so as to be highly flexible in a lateral direction and rigid in the direction perpendicular to the latter. The plate 4 also passes through a portion or length 5 (FIGS. 1 and 2) of the side member or bar which is intended to be rendered flexible.

The portion 5 of the side member of the spectacle frame is formed by a chain of articulated elements, which are of three different kinds. With reference to the first embodiment of the sidebar shown in FIGS. 1, 2 and 3, the elements of the first kind are formed by sliding bodies 6 (which, in the case of said first embodiment of the invention are of circular cross section), those of the second kind comprise intermediate members 7 having substantially the shape of a shell and, finally, the elements of the third kind comprise small blocks 8 of approximately parallelepiped shape. In the case of the embodiment according to FIGS. 2 and 3, said small blocks 8 are defined by concave cylindrical surfaces 9 opposed to one another (FIG. 3) and between these and the cylindrical surface of the bodies 6 the intermediate members 7 are disposed, which will define, therefore, a thin wall separating the bodies 6 from the small blocks 8. All the articulated elements of the three kinds described are passed through by the metallic core 4, which therefore has the function of holding them together.

Normally, the shells 7 are made of metal, while the bodies 6 and the small blocks 8 are of nonmetallic material, such as for instance a plastic material (particularly celluloid or cellulose acetate). However, in the side member or bar according to the invention, intermediate members 7 of nonmetallic material can also be utilized (for instance plastic material with particular antifriction characteristics) coupled with bodies 6 and small blocks 8, also of nonmetallic material, provided that the latter is different from that of the shell-shaped members 7. More generally, each of the three kinds of articulated members comprised in the chain of the deformable portion 5 of the sidebar may, at any rate, be made indifferently of metal or synthetic material.

Figure 5:
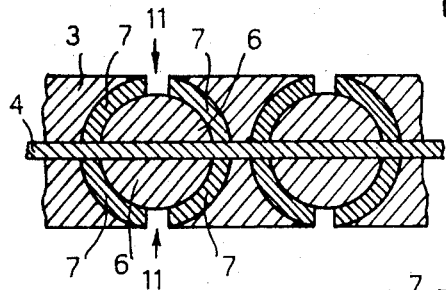
Figure 6:
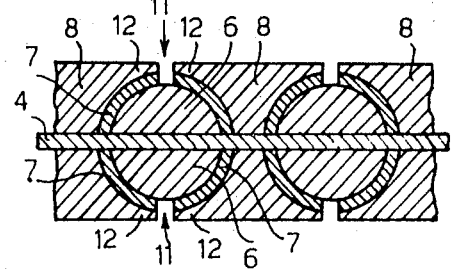

The side portions of each intermediate member 7 are so shaped as to form slightly protruding edges 10 (FIG. 3), between which a short interval or gap 11 is left free; this gap, as will be explained in more detail below, is provided for obtaining a desired deformability of the chain comprising the articulated elements of the three kinds described above. According to the other embodiments of the invention illustrated in FIGS. 5 and 6, the intermediate members 7 are not provided with protruding edges 10 but have substantially the form of a segment of a circular crown in cross section; the side edges of these shell-shaped members are flush with, or slightly protruding from, the major side faces of the side bar (FIG. 5) or are covered with a certain thickness 12 of the material of said sidebar (FIG. 6).

Figure 4:
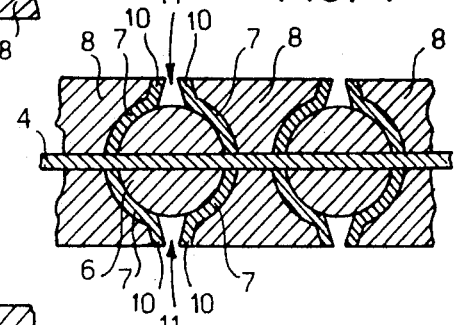
FIGS. 4, 5, 6, 7 and 8 show, respectively, portions of sections similar to that of FIG. 2, relating to different embodiments of the side member or bar.

The protruding edges 10 of each pair of intermediate members 7, enclosing one and the same sliding body 6, and which are disposed on the same side of the bar, can be parallel to one another (as shown in all the embodiments illustrated in the drawings, except that of FIG. 4), or also slightly convergent towards one another (FIG. 4). The advantages deriving from the conformation of the edges 10 according to either of the two modes illustrated (i.e., parallel or convergent edges) will be discussed below, during the description of the method for manufacturing the side members.

Figure 7:
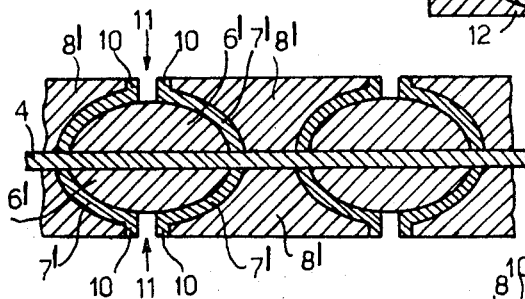

FIG. 7 shows a section of a flexible side member or bar in accordance with a further embodiment of the present invention. It still comprises small blocks 8' of parallelepiped shape (corresponding to the blocks 8 of the preceding embodiments), but between these small blocks 8' there are interposed sliding bodies 6' which, instead of being formed by cylinders of circular cross section, are bodies defined by an outer surface whose cross section originates a curve of approximately elliptical shape. Between the bodies 6' and the small blocks 8' there are interposed intermediate members 7' having, in cross section, a shape corresponding to that of the surfaces coupled together and which can be provided, or not, with side edges 10 slightly protruding towards the major side faces of the bar.

Figure 8:
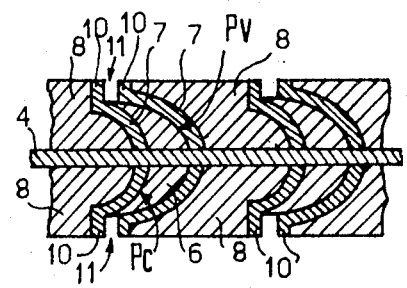

More generally, each sliding body disposed between two small blocks 8, 8', can be defined by an outer surface whose cross section (i.e., its directrix) may be a curve or whatever shape, but such as to permit coupling of the surface considered with corresponding surfaces of said small blocks and to enable insertion of intermediate members of corresponding cross section between such surfaces coupled together. In particular, as in the embodiment illustrated in FIG. 8, each body 6 disposed between a pair of intermediate members 7, can be defined by an outer surface which is partly concave ($P_c$) and partly convex ($P_v$), so as to form a chain of articulated elements whose convexities (or concavities) are all directed in the same direction.

Suitably, in all the embodiments described herein provision can be made for a certain spacing or clearance between each intermediate member 7, 7' and the corresponding small block 8 adjacent thereto. This clearance, not shown in the drawings, is provided between each protruding edge 10 (if any) and the material of the corresponding small block 8 adjacent thereto. Said clearance is necessary in order to allow a relative movement between the small blocks 8 and the intermediate members during the deformation or deflection of the sidebar in an angular direction. For this same purpose, it can be suitable to provide for some clearance between the metallic core 4 and some or all the holes passed through by said core in the articulated elements of the chain in the flexible portion of the sidebar.

During the lateral deformation or deflection of the sidebar described above, a relative movement of the various articulated elements disposed in correspondence with the portion 5 of said bar will take place. With reference to the embodiment shown in FIGS. 1, 2 and 3, for instance, during said deformation the small blocks 8 will move relative to the sliding bodies 6, and such movement will be shared by the intermediate members 7 also; in fact, owing to both the considerable flexibility of the metallic core 4 and said clearances or spacings existing between various parts of the various articulated elements, during the deformation of the sidebar a slight rotation of the small blocks 8 around the bodies 6 disposed between the latter will also take place, with consequent sliding movements in correspondence with the surfaces coupled together. Since between the bodies 6 and the small blocks 8 adjacent thereto the intermediate members 7 are inserted, between each pair body-intermediate member and intermediate member-small block two surfaces will be coupled together and, therefore, in correspondence with each of these pairs and for a determined relative movement of the small block with respect to the body very slight sliding movements will take place. Moreover, since the intermediate members 7 (most frequently of metallic material) can be made of a material different from that of the bodies 6 and the small blocks 8 (which are most frequently constructed of synthetic material, the coefficient of friction between pairs of elements made of different materials will be particularly low and, at any rate, lower than that which would result if the surfaces of the bodies in contact with one another were made of the same material.

With the gradual increase of the deflection of the sidebar, the width of the spacings 11 will decrease, becoming null when the protruding edges of the intermediate members 7 will come into contact, thereby cooperating with one another. In this condition, it may be assumed that the maximum deformation allowed has been reached, and therefore the aforementioned protruding edges coupled with one another will provide an efficient limit stop which restricts the relative rotation and therefore also the deformation of two small blocks 8 between which one body 6 is inserted, to a predetermined value. In this manner, as contrasted with the embodiments of the prior art, even though the sidebar should be deflected beyond the predetermined limit, this will not create any difficulty, inasmuch as the protruding edges 10 of the intermediate members 7 will be able to bear high pressures without undergoing any deformation. Therefore, the width of the spacing 11 can be chosen—by also taking into account the number of the articulated elements of the chain of the flexible portion 5 of the sidebar—so as to allow a desired angular deflection of said bar, in both directions.

The spectacle frame according to the present invention can be provided with sidebars having a configuration of the kind of those shown in FIGS. 9 and 10. In FIG. 9, the elements of the chain (i.e., sliding bodies, intermediate members and small blocks) are coupled together along parallel surfaces forming a given angle with the longitudinal axis of the sidebar. The axes of the sliding bodies of the embodiment shown in FIG. 10 form instead different angles with the longitudinal axis of said sidebar. Of course, it is also possible to realize arrangements wherein the angles formed by the cylindrical bodies with said axis of the sidebar are different from those shown in FIGS. 9 and 10.

Figure 11:
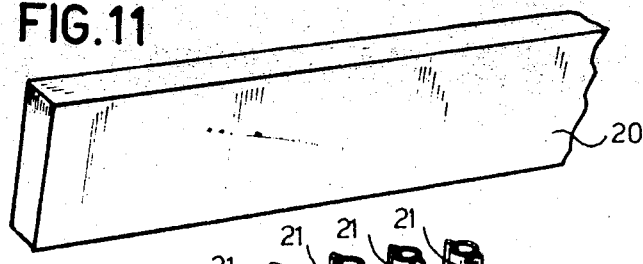
FIG. 11 is a perspective view of a bar of synthetic material utilized for producing a flexible side member with the method according to the invention.

For the construction of the spectacle frame with flexible sidebars, as described and illustrated herein, with the method of the present invention, use is made of a thin bar of synthetic material 20 (FIG. 11), for instance of celluloid or thermoplastic material, suitably cellulose acetate, and a plurality of tubular members 21 (FIG. 12), such as those illustrated in FIGS. 17, 19, 21 and 22.

In the region or portion of the bar 20, which is intended to be rendered flexible, the tubular members 21 are brought into contact with the upper face 22 of said bar, with their axes perpendicular to the plane in which the finished sidebar of the spectacle frame must be flexible. With this perpendicularity between the axes and the plane mentioned above, a sidebar of the kind of those illustrated in the spectacle frame of FIG. 1 will be obtained; when it is desired to obtain sidebars of the kind illustrated in FIGS. 9 and 10, the axes of the tubular members 21 will not be at right angles with said plane in the initial stage of the process.

Each tubular member shown in FIGS. 17, 19 and 21 comprises a central portion 23 and two diametrally opposed side extensions 24. These extensions 24 of said tubular members 21, instead of lying in one and the same diametral plane, as shown in the drawings, may also lie in two different planes, whereby the sections of said members will no longer be symmetrical about the centerline. The central portion 23 of each tubular member is substantially curved, whereas each of said extensions 24 will be substantially U-shaped (FIGS. 17 and 21) or substantially V-shaped (FIG. 19). Each tubular member 21 can be suitably obtained from a continuous structural shape of corresponding cross section, by cutting the latter in pieces of suitable length. In the middle portion 23 of the tubular member is provided, by any suitable process, a number of perforations or holes 25 of appropriate shape, through which the core 4 will be inserted.

Figure 12:
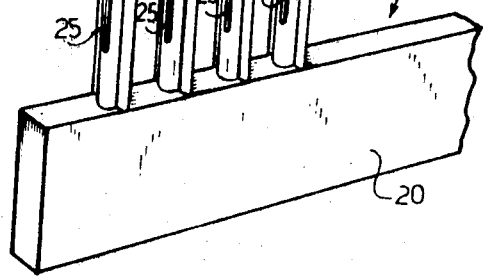
FIG. 12 is a perspective view of the bar of FIG. 11, on which tubular members are disposed, at the start of the processing step, during which they are introduced into the bar.

In the process step illustrated in FIG. 12, the various tubular members 21 are disposed with their extensions 24 directed towards the outside of the major surfaces of the bar 20 and, suitably, the width or thickness of said bar (i.e., its dimension corresponding to the width of the upper surface 22) is smaller than the maximum transverse dimension of each tubular member 21. The various tubular members are held, in their relative position with respect to said bar 20, as shown in FIG. 12, by suitable locking and support means (not shown in the drawings), which will allow displacement of said members in the direction of their axis during the subsequent manufacturing step.

Figure 13:
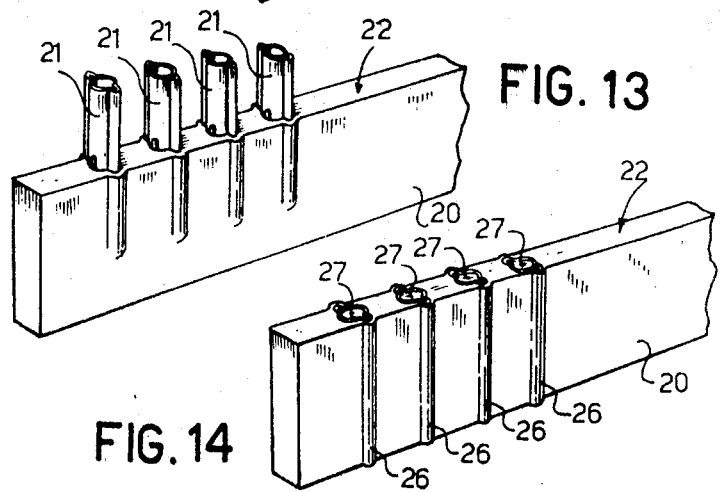
FIG. 13 is a perspective view of the bar shown in FIG. 11, into which said tubular members have been partially inserted according to the process of the invention.

Against the upper end of the tubular members 21 a suitable tool is placed, which is connected with a transducer of an ultrasonic drilling machine. As it is well known, such machine substantially comprises a generator of supersonant vibrations and a transducer which converts into mechanical vibrations the electric oscillations applied thereto by said generator. By means of said tool, these vibrations are transmitted to the various tubular members 21, whereby the latter will also be caused to vibrate with ultrasonic frequency. By simultaneously exerting on the tubular members, by means of said tool, pressures in a direction corresponding to that of the axes of said members and directed towards the upper surface 22 of the bar 20, the tubular members will penetrate at the inside of the material of said bar, as shown in FIG. 13, thereby avoiding the necessity of utilizing special abrasive powders. This penetration is due to both the mechanical action of the ultrasonic vibrations and the partial softening of the material of the bar by the heating caused by said vibrations.

Figure 14:
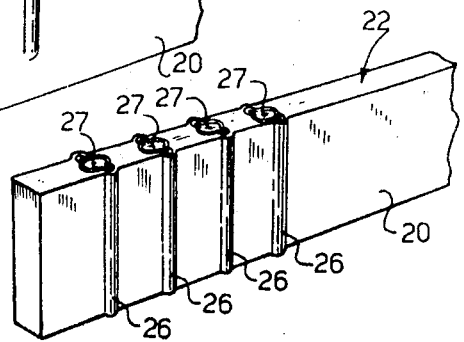
FIG. 14 is a perspective view of the bar shown in FIG. 11, after completion of the insertion of said tubular members.

By exerting said pressure and applying the ultrasonic vibrations to the tubular members 21 for an adequate period of time, these members will become completely inserted at the inside of the bar 20, as illustrated in FIG. 14. Since, as already stated, the transverse dimension of said tubular members is greater than the width or thickness of the bar 20, upon completion of the operation just described the major side faces of said bar will be provided with projections or ribs 26 substantially formed by a thin layer of synthetic material disposed over the end portions of each extension 24 of the tubular members 21. Further, during the penetration of said tubular members 21 into the mass of the material of the bar 20, the inner cavity or hollow space of these members will be filled with material, so that, by the end of the operation, each tubular member will have a core or inner filling 27 (FIG. 14), intended for forming the sliding body 6, of cross section substantially corresponding to that of the inner cavity 9 of the tubular members. After this operation, the metallic core is inserted into the bar 20 by techniques known per se, for instance by heating said bar until the material thereof has been rendered plastically deformable (softening). The metallic core will pass through the bar 20 and the perforations 25 of the tubular members 21 in a longitudinal direction. The core, in the finished sidebar, is designated with the reference numeral 4 in the FIGS. 2 to 8 of the drawings.

Figure 15:
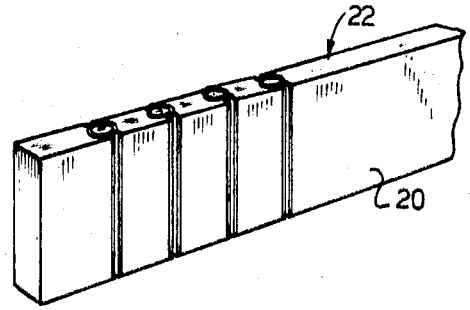
FIG. 15 is a perspective view of the bar shown in FIG. 14, after completion of the operation of removal of material from the major faces of said bar.

In the subsequent processing step, an adequate layer of material is removed in correspondence with the major side faces of the bar 20. During this operation, which can be suitably accomplished by milling, not only the layer of the material of said bar which covers the end portions of the expansions 24 of the tubular members 21 is removed, but also a portion of each of said expansions. The thickness removed should be such as to enable to obtain, from each tubular member 21, a pair of elements independent of one another, corresponding to the intermediate members 7, 7' (FIGS. 18, 20, 22) contained in the finished sidebar of the spectacle frame. This bar, at the end of the processing step just described, is shown in FIG. 15.

According to another feature of the method of the present invention, to insert the tubular members 21 at the inside of a bar 20, the latter can be simply prepared as shown in FIG. 16, i.e., by providing therein a number of holes 28 of cross section corresponding to that of the tubular members 21 which have to be subsequently introduced into said holes. To form the holes 28 in the bar 20, it can be again suitable to utilize an ultrasonic drilling machine of the kind mentioned above, except that, in the present instance, the holes in the bar are made by means of a profiled tool directly connected with the transducer of the machine. The holes 28 can also be made by following another procedure, for instance by plastic deformation of said bar under the action of heat (coining) or by any operation with removal of shavings (broaching).

If the bar 20 is prepared previously as shown in FIG. 16, it will be then only necessary to insert the tubular members 21 at the inside of the holes 28; the core or filling, which must be provided at the inside of each tubular member 21 in order to form the sliding bodies 6 in the finished sidebar, can be inserted into said members before introducing the latter into the corresponding holes 28, or also after the introduction of the tubular members into said holes. The subsequent manufacturing steps to obtain the finished sidebar are quite similar to those described above.

The tubular members 21 may be provided with U-shaped extensions (FIGS. 17, 21 and 23), whereby pairs of intermediate members 7 with parallel protruding edges 10 (FIGS. 18, 22 and 24) will be obtained; however, said tubular members can also be provided with V-shaped extensions (FIG. 19). The sidebar obtained by utilizing tubular members of this latter kind, provides an embodiment corresponding to that illustrated in FIG. 20, i.e., wherein the protruding edges of each pair of intermediate members 7 which encloses a sliding body 6 are converging outwardly. By utilizing tubular members having a cross section corresponding to that illustrated in FIG. 19, it will be possible to obtain cavities 11 of any width desired. In fact, depending on the thickness of material removed from the major side faces of the bar during the milling operation described above, the expansions 24 of the tubular member 21 will be cut at a different distance from the axis of said tubular member, thereby giving rise to a cavity 11 of different width.

Further, the method in accordance with the invention permits to utilize tubular members of any suitable cross section; for instance, with the tubular member shown in FIG. 21, whose middle portion 23 has a cross section which is not circular but rather substantially elliptical or oval in shape, it is possible to obtain a finished sidebar having, in cross section, the shape illustrated in FIG. 22. In addition, as shown in FIG. 23, the middle portion of the tubular member 21, instead of having two convex walls as in the instances discussed up to this point, can exhibit a concave wall $P_c$ and a convex wall $P_c$; a section of one flexible sidebar obtained with such tubular member is illustrated in FIG. 24 of the drawings.

Finally, for the manufacture of the flexible sidebar, instead of utilizing tubular members 21 it is possible to use pairs of shell-shaped elements 29 having, in cross section, the form illustrated in FIG. 25 and provided with side edges 30. Each pair of shells 29 has the corresponding side edges 30 in abutment with one another and defines, at the inside thereof, a hole of desired cross section, which is circular in the case of FIG. 25. The introduction of each pair of shells 29 at the inside of the bar can be accomplished in any of the manners described above with reference to the tubular members 21.

Finally, the shell-shaped elements 29 can be provided with parallel side edges 30 (FIG. 26); in order to introduce these shells at the inside of the bar 20, use can suitably be made of an inner spindle 31 adapted to hold one of said shells in one desired relative position with respect to the other, so as to define a spacing of desired width between the side edges of the two shells.

It is to be understood that the above description is merely illustrative of some embodiments of the present invention given by way of example and that many modifications and variations may be introduced both in these embodiments and in the processing steps set forth and illustrated above without departing from the scope and the spirit of the invention.

The claims defining the invention are as follows:

1. In a spectacle frame of relatively rigid material comprising a front part and side members hinged thereto, and having at least one flexible portion formed by a chain having elements mutually articulated along cylindrical surfaces and held together by a flexible inner core passing through said chain, said elements comprising, alternately, small cylindrical bodies and small blocks interposed therebetween, whose faces directed toward the cylindrical bodies are concave in shape and have a cylindrical surface which encompasses part of the adjacent cylindrical body; the improvement comprising part cylindrical shells of a material different from the material of said bodies and blocks and interposed between said bodies and blocks.

2. A spectacle frame as claimed in claim 1, each of said shells having radially outwardly extending end flanges which overlie adjacent edges of said blocks.

3. A spectacle frame as claimed in claim 2, said flanges contacting each other in a bent position of said at least one flexible portion to limit flexure of said portion and to maintain said blocks out of contact with each other.

* * * * *